W. H. NUNAMACHER.
CAR TRUCK.
APPLICATION FILED DEC. 13, 1912.
1,074,811.
Patented Oct. 7, 1913.
2 SHEETS—SHEET 2.
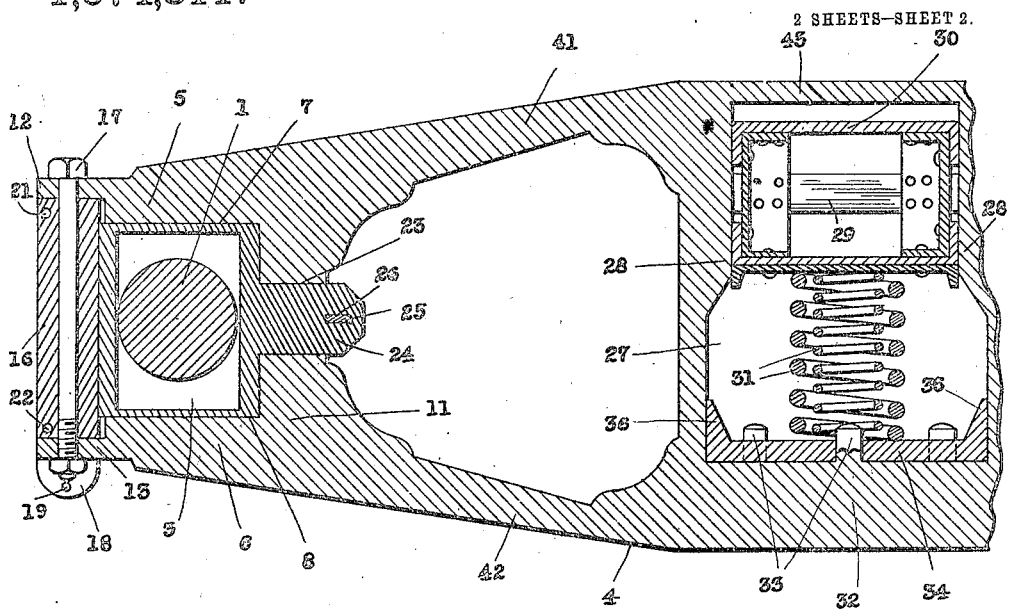
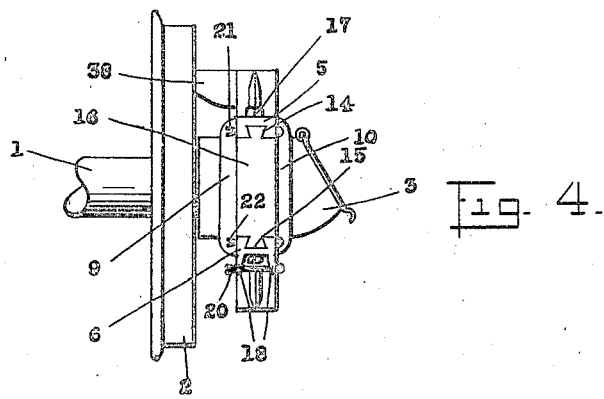
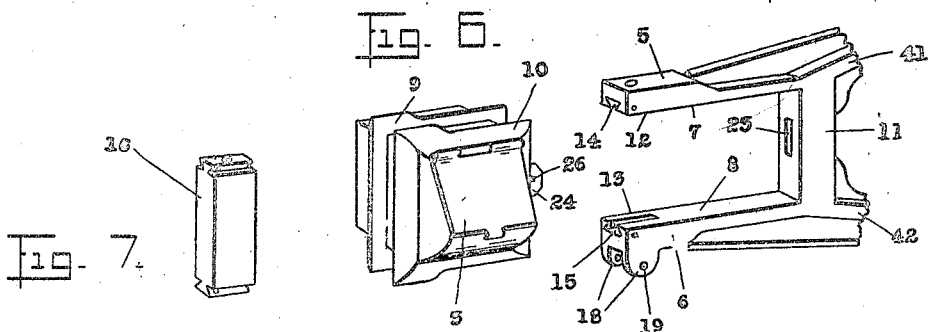
WITNESSES:
Howard R. King
Mildred E. Brook
INVENTOR:
William H. Nunamacher
BY Russell M. Everett
ATTORNEY.

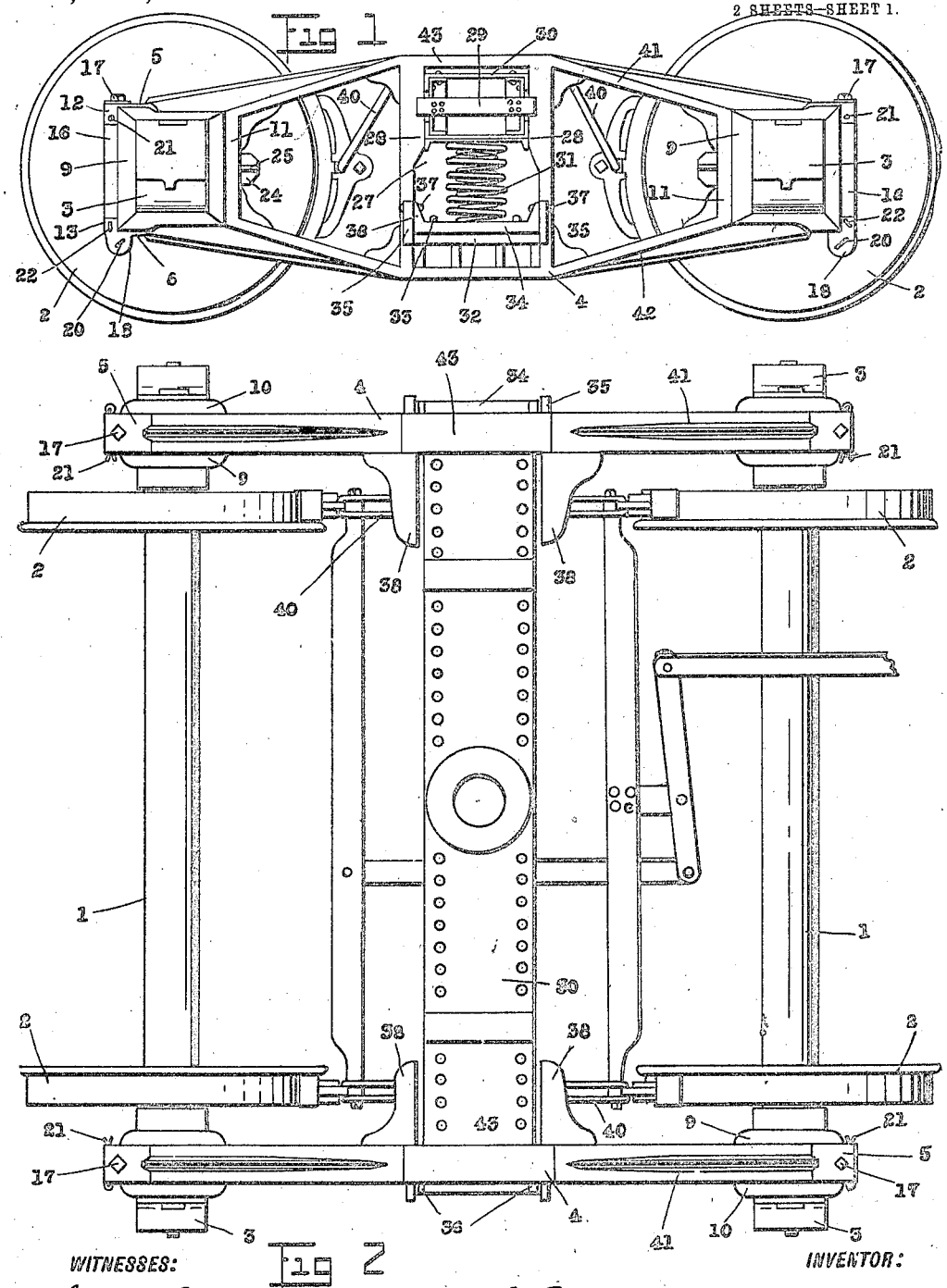

UNITED STATES PATENT OFFICE.

WILLIAM H. NUNAMACHER, OF NEWARK, NEW JERSEY.

CAR-TRUCK.

1,074,811.  Specification of Letters Patent.  Patented Oct. 7, 1913.

Application filed December 13, 1912. Serial No. 736,532.

*To all whom it may concern:*

Be it known that I, WILLIAM H. NUNAMACHER, a citizen of the United States, residing at Newark, in the county of Essex and State of New Jersey, have invented certain Improvements in Car-Trucks, of which the following is a specification.

The objects of this invention are to provide a car truck having side frames and transverse connecting means which are separably connected, so that any one of said parts can be readily removed and repaired or replaced independent of the others; to secure an improved connection of the bolster and the spring plate to the side frames; to provide an improved construction of side frame, which shall extend around and inclose the journal boxes so as to positively secure the same against displacement; to thus obtain safety and avoid wrecks caused by the journal boxes escaping from car trucks; to enable said journal boxes at the same time to be readily removed and replaced, for repair and the like, and to obtain other advantages and results as may be brought out in the following description.

Referring to the accompanying drawings, in which like numerals of reference indicate the same parts throughout the several views, Figure 1 is a side elevation of a car truck embodying my invention; Fig. 2 is a plan of the same; Fig. 3 is a vertical longitudinal section through a portion of one of the side frames; Fig. 4 is an end view of one side portion of the truck; Fig. 5 is a perspective view of the jaws of a side frame with the journal box removed therefrom; Fig. 6 is a perspective view of the journal box as removed from said jaws, and Fig. 7 is a perspective view of a certain filling block removed from the jaws.

In the specific embodiment of the invention illustrated in said drawings, the reference numerals 1, 1 indicate axles carrying car wheels 2, all of any ordinary and well-known construction. As is usual, the ends of these axles 1, 1 outside the wheels 2 project into journal boxes 3 arranged in the side frames 4, 4 of the truck. My invention relates in part to the support and retention of these journal boxes by the side frames to render the same more secure and the truck less liable to accident. In order to effect this, I provide at each end of both of the side frames 4, 4, and forming part thereof, top and bottom jaws 5, 6, the two jaws of each pair being spaced apart and parallel at their inner or facing surfaces 7, 8 so as to form guideways for the introduction of the journal box longitudinally of the side frame into its seat between said jaws.

The journal box, which may be of any desired or well-known construction, preferably has cast about it in planes perpendicular to the axle when placed therein, a pair of exterior collars 9, 10, arranged near the ends of the journal box at a distance apart. The journal box and the jaws 5, 6 of the side frame are proportioned one to the other so that the height of the journal box between the collars 9, 10 will be equal to the distance between the parallel surfaces 7, 8 of the jaws; furthermore, the spacing apart of the collars 9, 10 on the journal box is equal to the width of the jaws 5, 6, so that the journal box may be slipped between said jaws and the jaws lie between the collars to prevent movement of the journal box laterally of the frame. By this means, I relieve the truck bolt, hereinafter described, from any strain due to end thrust upon the journal box, thereby lessening the possibility and danger of breaking said bolt.

In order to retain the journal box between the jaws, when slid into its seat, said jaws have ends 12, 13 which project beyond the journal box and in the facing or inner surfaces of these projecting ends are cut dove-tail grooves 14, 15 adapted to receive the correspondingly dove-tailed ends of a filling block 16, see Figs. 5, 6 and 7 more especially. This filling block is slid into place after the journal box and spans the opening between the jaws, and by virtue of its dove-tail joints with said jaws, the filling block will prevent the jaws from spreading. The collars 9, 10 of the journal box are adapted to overlap this filling block 16, and similarly they overlap the inner closed end 11 of the journal box seat, so that the truck frame not only extends clear around and incloses the journal box, but the collars seat clear around said journal box against the said frame.

A truck bolt 17 extends vertically through the filling block 16 and the projecting ends 12, 13 of the jaws 5, 6, and is adapted to hold the filling block from sliding out of its dove-tail grooves 14, 15 as well as bind the said jaws together. By the structure as just described, the only material strain brought upon this truck bolt 17, when the truck is running, is a shear at the juncture of the filling block and the jaws which may arise from the journal box tending to slide out of its seat, and the bolt is relieved by the reinforcement of the filling block 16 from most of the tension caused by the tendency of the jaws to spread and from the bending pressure of the journal box. Furthermore, by surrounding the bolt by the said filling block, free from the journal box, the bolt is relieved of the constant abrasive wear set up by the slight movement of the journal box when the truck is in service.

To prevent the nut on the truck bolt 17 from working off, I provide a pair of depending lugs or ears 18, 18 upon the lower jaw 6 at either side of the bolt hole. These ears are provided with alined apertures 19, 19 adapted to receive a cotter-pin 20 which will be held thereby directly beneath the end of the bolt 17, as clearly shown in Figs. 3 and 4.

As a further precautionary measure against inadvertent dislodgment of the filling block 16, I insert transversely through the projecting ends 12, 13 of the jaws 5, 6 and the dove-tailed portions of the filling block therebetween, a pair of cotter-pins 21, 22, one at each end of said block, which thereby secure the filling block in position.

At the inner closed end of the seat for the journal box the vertical portion 11 of the frame is mortised centrally of itself and parallel to the jaws 5, 6, as at 23, for the insertion of an appropriate tenon 24 secured to or made integral with the journal box, see Figs. 3, 5 and 6. This tenon 24 is adapted to extend through said mortise with its free end or extremity projecting upon the opposite side of the frame portion 11 from the journal box, when said journal box is slid into place between the jaws. A key 25 or other suitable retaining means may then be inserted through an aperture 26 in said projecting end of the tenon to prevent the same from withdrawing from its mortise inadvertently.

I do not wish to be understood, however, as limiting myself necessarily to the use of all of the retaining mechanisms for the journal box above described, as it may be found desirable to use one to the exclusion of the others or omit part and retain the rest. The side frames 4, 4 are provided each at its center with a horizontally transverse opening 27, the upper portion of which is made of less width than the lower part by means of inset sides 28, 28 which form parallel and vertical guideways for the bolster 30 to slide up and down between, as may be necessary in the use of the truck. In order to retain the bolster against displacement longitudinally of itself from the side frames 4, 4, I rivet or otherwise secure thereon cleats 29 which project beyond the sides of the bolster and overlap the side frames. Any suitably equivalent means known to the art can be used, however, for effecting the same purpose of connecting the ends of the bolster to the side frames so as to slide up and down therein and yet not shift transversely of said frames. The projecting ends of the cleat or other means are short enough to pass through the lower wider part of the opening 27, when the bolster is brought thereinto for insertion or removal of the bolster with respect to the side frames, but it will be appreciated that while in service the bolster is held in the upper part of the opening 27 by bolster springs 31, as is usual, so that the ends of the cleats or other means engage the side frames as above described.

Projecting upwardly from the bottom wall 32 of each opening 27, are a plurality of dowels 33, preferably cast integral with the side frame, as shown more especially in Fig. 3. A spring plate 34, of any ordinary or well-known form, extends between the two side frames, beneath the bolster 30, seating upon the bottom walls 32, 32 of the openings 27, 27, and receiving the dowels 33 in appropriate recesses in itself. The spring plate 34 is therefore held firmly with respect to the side frames, positively preventing the same from spreading apart with respect to each other, and yet so affixed thereto that said side frames may be readily separated or removed when so desired. It will be noted that the said spring plate is preferably the width of the lower part of the opening 27 and fits snugly within the same to prevent contortion or twisting. The bolster springs rest directly upon the spring plate and tend to hold the same fast against its seat and upon the dowels, and preferably the dowels project through the spring plate so as to provide studs or posts over which the springs can set and be prevented from shifting sidewise. In order, however, to insure positive retention of the spring plate to the side frame, if desired, I provide parallel ears 35, 35 projecting from the outer side of each of the side frames at opposite sides of the lower large portion of the aperture 27, adjacent to the bottom wall thereof, so that said ears lie flatwise against upwardly projecting flanges 36, 36 at the lateral edges of the spring plate. A pin 37, or any other suitable means, may then be inserted through each of the ears 35 and the adjacent flange 36 of the spring plate, whereby all possibility of disengagement of the side frame and spring plate is averted.

Upon the inner side of each side frame and at its upper portion, upon either side of the bolster 30, I provide brake hangers or brackets 38 projecting inwardly of the truck. These brackets are preferably cast integral with the side frames, independent of the bolster, and are adapted to support the brakes 39, by links 40, in fixed relation to the wheels. The brackets, it will be noted, are at the angles where the upper arms 41, 41 extend from the middle portion 43 of a side frame to the journal-box-carrying end portions, the corresponding lower arms being marked 42, 42. It will also be noted that these upper and lower arms 41, 42 are preferably disposed symmetrically above and below a line through the two journal boxes centrally of the bearings provided thereby.

Having thus described the invention, what I claim is:

1. In a car truck, a side frame having at its end horizontally disposed upper and lower jaws, a journal box seated between said jaws, a filler between said jaws having dove-tailed ends engaging the same to hold them against spreading, and means for releasably securing said filler.

2. In a car truck, a side frame having at its end horizontally disposed upper and lower jaws, a journal box seated between said jaws, jaws having dove-tailed ends engaging the same to hold them against spreading and a truck bolt extending between said jaws outside said journal box to prevent escape of the same.

3. In a car truck, a side frame having at its ends horizontally disposed upper and lower jaws, a journal box seated between said jaws, a filler between said jaws having dove-tailed ends engaging the same to hold them against spreading, and a truck bolt extending through said jaws and filler.

4. In a car truck, a side frame having at its end horizontally disposed upper and lower jaws, a journal box seated between said jaws, a filler between said jaws having dove-tailed ends engaging the same to hold them against spreading and a truck bolt extending between said jaws outside said journal box to prevent escape of the same, ears depending from the side frame on opposite sides of the lower end of said truck bolt, and a cotter-pin extending through said ears beneath said bolt.

5. In a car truck, a side frame having at its end horizontally disposed upper and lower jaws, a journal box seated between said jaws, a filler between said jaws having dove-tailed ends engaging the same to hold them against spreading, and means for releasably securing said filler, and cotter-pins extending one through each dove-tailed joint to prevent separation of the members thereof.

6. In a car truck, a side frame having at its end horizontally disposed upper and lower jaws, a journal box seated between said jaws having a tenon projecting into a corresponding mortise in the end of the side frame, and means for securing said tenon against withdrawal.

7. In a car truck, a side frame having at its end horizontally disposed upper and lower jaws, a journal box seated between said jaws, and means releasably securing said journal box to the inner end wall of its seat to prevent outward escape of the same from between said jaws.

WILLIAM H. NUNAMACHER.

Witnesses:
Russell M. Everett,
Howard P. King.